(12) United States Patent
Dolzinski et al.

(10) Patent No.: US 8,720,826 B2
(45) Date of Patent: May 13, 2014

(54) WINDOW ELEMENT FOR A DOUBLE-SHELL SKIN FIELD OF AN AIRCRAFT FUSELAGE CELL

(75) Inventors: Wolf-Dietrich Dolzinski, Ganderkesee (DE); Norbert Heltsch, Hamburg (DE); Arne Hartwig, Hamburg (DE); Markus Mueller, Friedrichshafen (DE); Markus Joerg Weber, Hamburg (DE); Jens-Ulrich Prowe, Hamburg (DE); Paul Joern, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 790 days.

(21) Appl. No.: 12/723,442

(22) Filed: Mar. 12, 2010

(65) Prior Publication Data

US 2011/0042516 A1 Feb. 24, 2011

Related U.S. Application Data

(60) Provisional application No. 61/160,848, filed on Mar. 17, 2009.

(30) Foreign Application Priority Data

Mar. 17, 2009 (DE) .......................... 10 2009 013 511

(51) Int. Cl.
*B64D 1/14* (2006.01)
(52) U.S. Cl.
USPC ....................................... 244/129.3

(58) Field of Classification Search
USPC ............. 244/119, 129.1, 129.3, 129.4, 129.5; 52/204.5, 786.1, 656.7, 211, 208, 213; 296/190.1, 200, 201, 146.1, 146.15, 296/145, 84.1
See application file for complete search history.

(56) References Cited

U.S. PATENT DOCUMENTS

| | | | | |
|---|---|---|---|---|
| 2,388,786 | A * | 11/1945 | Knight et al. | 52/208 |
| 5,397,080 | A * | 3/1995 | Berg | 244/129.2 |
| 6,089,646 | A * | 7/2000 | Xu et al. | 296/146.15 |
| 7,509,774 | B1 * | 3/2009 | Johnson et al. | 52/2.11 |
| 7,988,094 | B2 * | 8/2011 | Ostrem et al. | 244/129.3 |
| 2004/0021334 | A1 * | 2/2004 | Blevins et al. | 296/84.1 |
| 2008/0217479 | A1 * | 9/2008 | Wood | 244/129.3 |
| 2009/0084900 | A1 * | 4/2009 | Krahn | 244/129.3 |
| 2012/0056037 | A1 * | 3/2012 | Dolzinski et al. | 244/119 |

FOREIGN PATENT DOCUMENTS

DE 102005058749 A1 2/2007

* cited by examiner

*Primary Examiner* — Valentina Xavier
(74) *Attorney, Agent, or Firm* — Leydig, Voit & Mayer, Ltd.

(57) ABSTRACT

A window element for a double-shell skin field of an aircraft fuselage cell includes a window frame having a window module disposed in the frame, wherein the frame is disposed in an opening of the double-shell skin field, and wherein the frame is connected to the double-shell skin field by a surrounding embrasure profile positioned against a core structure of the skin field at least in some regions, wherein the core structure includes an inner and an outer covering layer.

14 Claims, 2 Drawing Sheets

WINDOW ELEMENT FOR A DOUBLE-SHELL SKIN FIELD OF AN AIRCRAFT FUSELAGE CELL

Priority is claimed to German Application No. DE 10 2009 013 511.1, filed Mar. 17, 2009, and U.S. Provisional Application No. 61/160,848, filed Mar. 17, 2009. The entire disclosure of both applications is incorporated by reference herein.

The invention concerns a window element for a double-shell skin field of an aircraft fuselage cell, wherein the skin field has a core structure with an inner and an outer covering layer and the window element has a window frame with a window module accommodated therein.

BACKGROUND

Aircraft fuselage cells for large aircraft are at the present time predominantly formed with monolithic skin fields. For purposes of stiffening a multiplicity of longitudinal stiffeners, running parallel to the flight direction and separated from one another, are provided on the inner faces of the monolithic skin fields. Moreover a multiplicity of annular frames are arranged on the inner faces of the skin fields, in each case aligned transversely to the flight direction. The monolithic skin fields, thus reinforced, are in the manner of multi-shell construction completed to form barrel-like fuselage sections and are then joined in series one behind another to form a complete aircraft fuselage cell.

Furthermore double-shell skin fields for the manufacture of fuselage cell structures are of known art in which a core structure is provided on both faces with an inner and an outer covering layer to create a sandwich-type structure curved in at least one dimension. The core structure used can be of any form of spatial embodiment, for example a honeycomb core, a foam core or a folded comb core, to provide a preferably uniform separation distance between the covering layers.

The double-shell skin fields have the advantage, amongst others, that a significantly reduced number of longitudinal stiffeners and annular frames are required for reinforcement, resulting in a reduction of manufacturing resource and weight. In the ideal case the frames and longitudinal stiffeners can be dispensed with entirely. Moreover a double-shell skin field features excellent thermal insulation properties, such that the additional primary thermal insulation with insulation material that is otherwise required in the case of monolithic skin fields can at least partially be dispensed with. Furthermore it is of known art to form fuselage cell structures with fuselage sections that are manufactured with a combination of monolithic and double-shell skin fields so as to combine the specific advantages of these forms of construction.

Irrespective of the use of monolithic skin fields and/or double-shell skin fields in the manufacture of a fuselage section it is generally essential for psychological reasons to integrate a multiplicity of windows into the fuselage cell structure, at least in the case of passenger aircraft. However, from the structural viewpoint the windows represent a significant weakening of the primary structure and require in general an increase in the weight. Accordingly, from the prior art a multiplicity of weight-optimised solutions for the installation of windows in aircraft fuselage cells are of known art.

From DE 10 2005 058 749 A1 for example a solution optimised in terms of weight and strength using a surrounding contact pressure frame for the integration of a window into a monolithic skin field is of known art.

SUMMARY OF THE INVENTION

An aspect of the present invention is to create a window element that allows integration of a window into a double-shell skin field that is optimised in terms of weight and at the same time is advantageous from the structural viewpoint.

In that an opening is introduced into the double-shell skin field for the accommodation of the window frame, wherein the window frame is connected to the double-shell skin field by means of a surrounding embrasure profile positioned against the core structure, at least in some regions, a closure of the core structure that is otherwise exposed in the region of the window opening firstly ensues. Moreover as a result of the embrasure profile integrated into the core structure the torsional stiffness of the double-shell skin field in the region of the window opening is increased with a justifiable weight addition, so that as a result of the window element according to the invention no relevant structural weakening of the primary structure occurs.

A further development of the window element according to the invention envisages that the embrasure profile has a C-shaped cross-sectional geometry with inner and outer arms running parallel to one another, wherein the arms are connected by means of a profile web.

As a consequence of this embodiment the embrasure profile can be connected both to the inner covering layer and also to the outer covering layer of the double-shell skin field, and at the same time to both flanges of a window frame for the accommodation of a window module. At the same time the web at right-angles enables the core structure to be closed off from the window opening. The mechanical connection of the components cited can take place by means of bolting, riveting, and/or at least in some regions by the application of adhesive. By the positioning of the window element on the inner skin and the outer skin of the double-shell skin field window loads are introduced into both skins.

In accordance with a further advantageous embodiment of the window element provision is made that an outer covering layer opening is of smaller extent than an inner covering layer opening, and a core structure opening is of larger extent than the inner covering layer opening.

This ensures that any expulsion of the window element from the fuselage cell structure is prevented under all conceivable operating conditions of the aircraft.

A further embodiment of the window element envisages that the outer arm of the embrasure profile is designed to be longer than the inner arm of the embrasure profile.

By this means account is taken of the fact that the external covering layer opening is of smaller extent in comparison to the inner covering layer opening.

BRIEF DESCRIPTION OF THE DRAWINGS

Further advantageous embodiments of the window element are recorded in further claims.

In the drawing.

DETAILED DESCRIPTION

Figure 1:
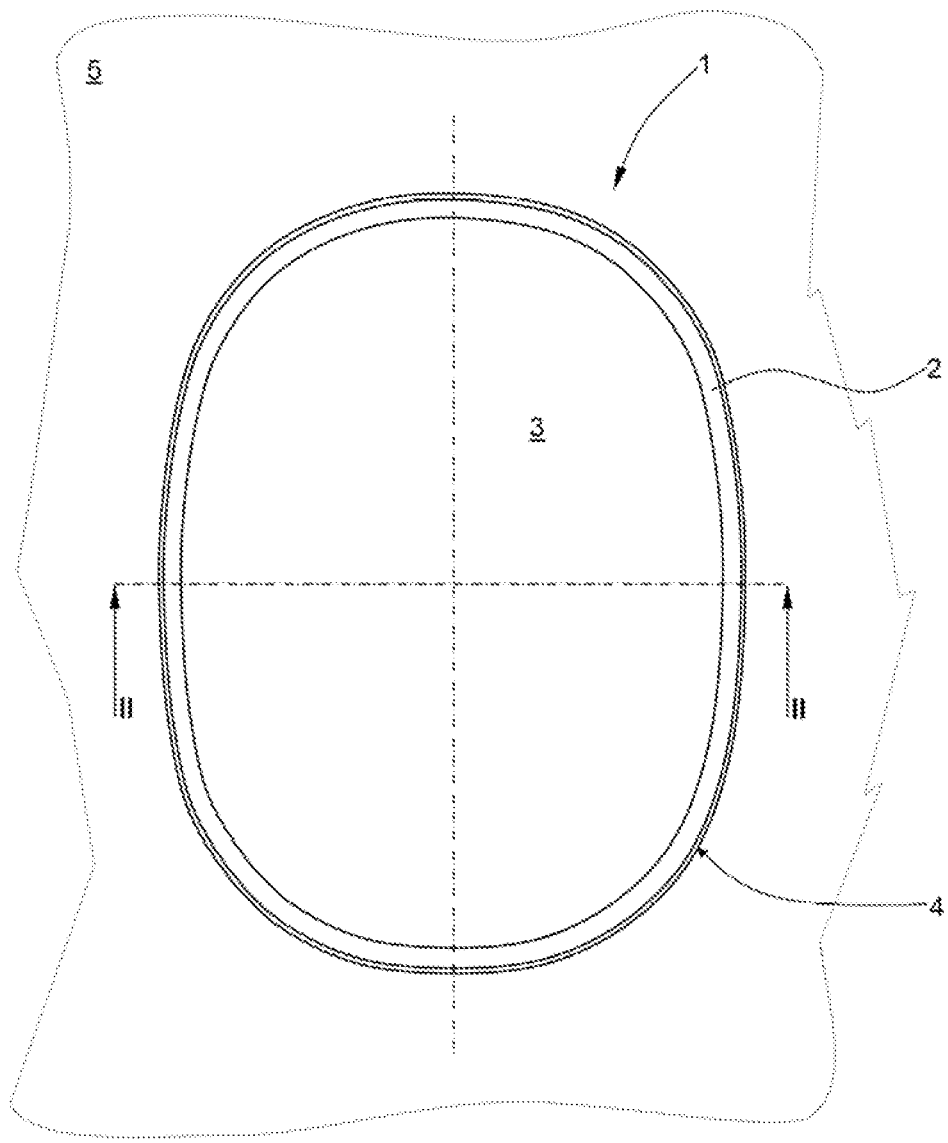
FIG. 1 shows a plan view from the exterior of the aircraft fuselage cell onto a window element that is integrated into a double-shell skin field.

In the drawing the same design elements have the same reference number in each case.

FIG. 1 shows a plan view onto a window element according to the invention.

A window element 1 comprises amongst other items a window module 3 accommodated in a window frame 2. The window frame is attached within an opening 4 within a double-shell skin field 5 of an aircraft fuselage cell, not represented. In a deviation from the contour, approximately oval-elliptic, of the window element shown in FIG. 1, the latter can, for example, also have an approximately circular or elliptical contour.

Figure 2:
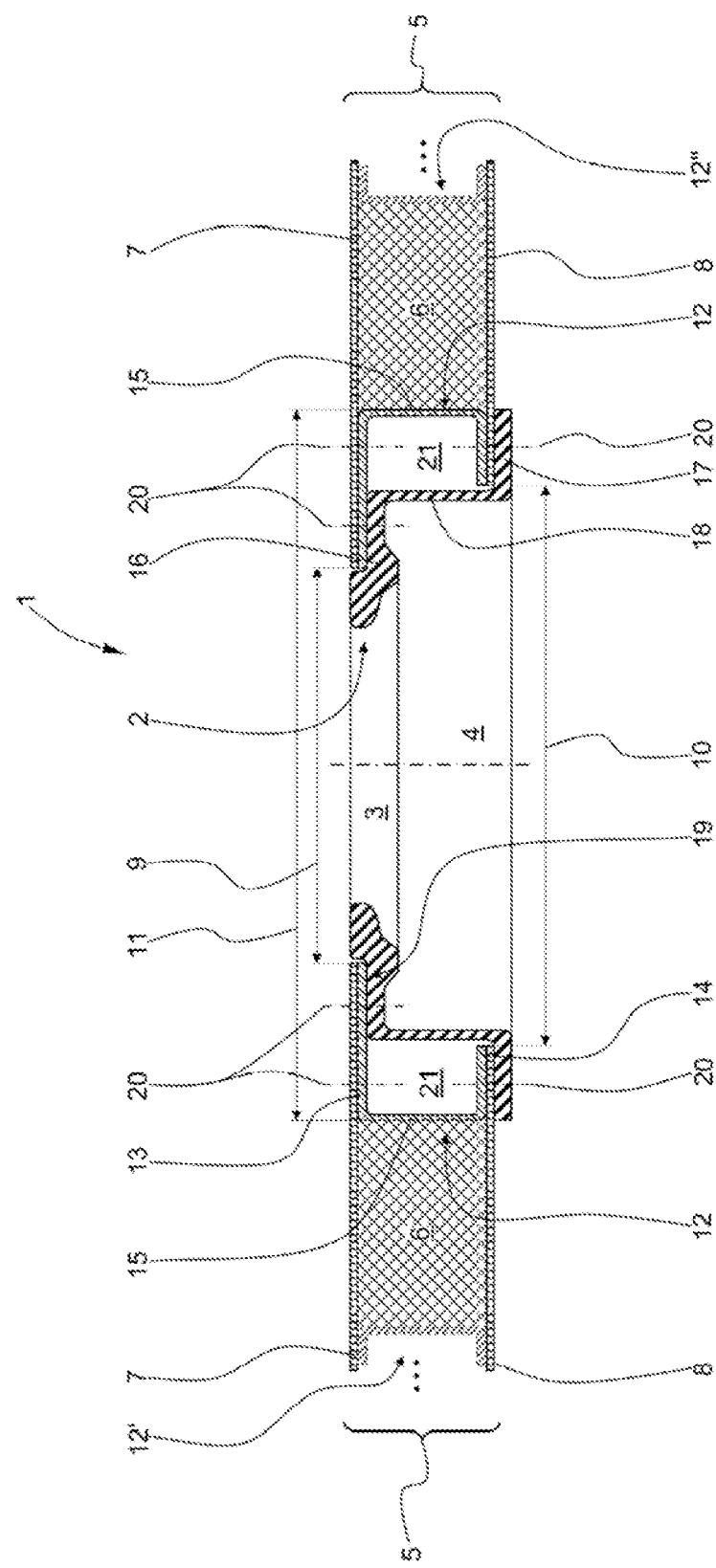
FIG. 2 shows a cross-sectional representation along the cutting line II-II in FIG. 1.

FIG. 2 illustrates a detailed sectional representation along the cutting line II-II in FIG. 1.

The window module 3, designed as a double glazed unit, is fixed in its position in the window frame 2 by attachment elements that are not represented in any further detail. The double-shell skin field 5 comprises a core structure 6, which is provided with outer and inner covering layers 7, 8 running approximately parallel to one another. An outer covering layer opening 9 is introduced into the outer covering layer 7, an inner covering layer opening 10 is introduced into the inner covering layer 8, and a core structure opening 11 is introduced into the core structure 6; together these embody the stepped design of opening 4 for the integration of the window element 1 into the double-shell skin field 5 of the fuselage cell structure.

An embrasure profile 12 embodied according to the invention is integrated into the opening 4. The embrasure profile 12 completely surrounds the approximately oval-elliptic contoured opening 4 in the double-shell skin field of the fuselage cell structure on its inner face, and is preferably of one piece, that is to say, embodied without any seams. The embrasure profile 12 can optionally be embodied as a number of parts, in order to ease the installation, amongst other reasons. At least two embrasure profile sections, possibly of different lengths, can in this form of embodiment be joined together to form one embrasure profile 12. Furthermore it is conceivable that although the embrasure arm 12 is designed in one piece, it has a split line, i.e. a narrow gap, that can be joined together after installation.

On both sides of the core structure opening 11 further embrasure profiles 12' and 12" are provided, in each case of identical embodiment to the embrasure profile 12; these likewise form a surrounding closure of the core structure 6 for the integration of further window elements, not represented, as part of a row of windows in the double-shell skin field 5 of the aircraft fuselage cell. Any further description can accordingly be limited to the elucidation in more detail of the geometric embodiment of the embrasure profile 12.

The embrasure profile 12 features an outer arm 13, and an inner arm 14 running parallel to the former, wherein in the example of embodiment shown in FIG. 2 the outer and the inner arms 13, 14 are connected by means of a profile web 15 running at right-angles. The profile web 15 is positioned against the core structure and effects its closure, in particular against damaging atmospheric influences. The window frame 2 features an outer flange 16 as well as an inner flange 17 running parallel to the former; in the example of embodiment shown these are connected to one another by means of a flange web 18 positioned at right-angles. In contrast to the embrasure profile 12 the outer flange 16 and the inner flange 17 of the window frame 2 are designed to be approximately of equal length. Alternatively the outer flange 16 and the inner flange 17 can be embodied to be of different lengths.

The outer flange 16 of the window frame 2 features a surrounding recess 19. The outer arm 13 of the embrasure profile 12 is positioned together with the outer covering layer 7 in the recess 19 and is connected to the latter by means of at least one suitable connection means 20. As the connection means 20 rivets, bolts, and/or adhesive joints embodied at least in some regions, can, for example, be used as alternatives—if need be depending on the attachment location and/or the loads applied there.

At least one further connection means 20 in addition connects the outer arm 13 of the embrasure profile 12 to the outer covering layer 7 of the double-shell skin field 5. To complete the attachment of the window frame 2, the inner flange 17 of the window frame 2 is in addition connected to the inner covering layer 8 and the inner arm 14 of the embrasure profile 12 by means of at least one further connection means 20.

Between the flange web 18 and the profile web 15 there exists an intermediate space 21 that can optionally be filled with a suitable filler material, for example a closed-cell hard foam, for purposes of thermal insulation. The profile web 15 of the embrasure profile 12 can be mechanically connected to the core structure 6. This can, for example, take place by means of an adhesive joint embodied at least in some regions. The window frame 2, as in the case of the embrasure profiles 12, 12', 12", is preferably designed in one piece.

The window frame 2 and the embrasure profile 12 can be formed from a metallic material, for example from an aluminium alloy, a stainless steel alloy or a titanium alloy, and/or from a fibre-reinforced composite material, such as, for example, a carbon fibre-reinforced epoxy resin. The double-shell skin field 5 has in general covering layers 7, 8 that are formed from a fibre-reinforced composite material, while the core structure 6 is formed from a metallic material and/or, if appropriate, from a fibre-reinforced plastic material, such as, for example, Nomex® paper. Alternatively the core structure 6 can be constructed from a hard foam material.

As a consequence of the attachment of the window frame 2 by means of the surrounding embrasure profile 12 within the opening 4 of the double-shell skin field 5 an integration of a window into the double-shell skin field 5 that is optimised in terms of structure and weight is ensured.

As indicated by the two continuation symbols = . . . = the window element 1 shown in FIG. 2 can be, but does not have to be, part of at least one row of windows in the fuselage cell structure of a passenger aircraft, extending on both sides with a multiplicity of windows in each case arranged preferably uniformly relative to one another.

| Reference symbol list | |
|---|---|
| 1 | Window element |
| 2 | Window frame |
| 3 | Window module |
| 4 | Opening (double-shell skin field) |
| 5 | Double-shell skin field |
| 6 | Core structure |
| 7 | Outer covering layer |
| 8 | Inner covering layer |
| 9 | Outer covering layer opening |
| 10 | Inner covering layer opening |
| 11 | Core structure opening |
| 12 | Embrasure profile |
| 12' | Embrasure profile |
| 12" | Embrasure profile |
| 13 | Outer arm ⎫ |
| 14 | Inner arm ⎬ Embrasure profile |
| 15 | Profile web ⎭ |
| 16 | Outer flange ⎫ |
| 17 | Inner flange ⎬ Window frame |
| 18 | Flange web ⎭ |
| 19 | Recess |
| 20 | Connection means |
| 21 | Intermediate space |

What is claimed is:

1. A window element for a double-shell skin field of an aircraft fuselage cell, the double-shell skin field including a core structure disposed between an inner covering layer and an outer covering layer and having an opening, the window element comprising:
- a window frame disposed within the opening of the double-shell skin field; having
- a window module disposed in the window frame; and, wherein the frame is disposed in an opening of the double-shell skin field, and wherein the frame is connected to the double-shell skin field by a surrounding
- an embrasure profile surrounding the window frame, the embrasure profile connecting the window frame to the double-shell skin field and being positioned against a the core structure of the skin field at least in some regions, wherein the core structure includes an inner and an outer covering layer,
- wherein the embrasure profile includes a C-shaped cross-sectional geometry with an inner and an outer arm running parallel to one another, and wherein the inner and the outer arms are connect connected by a profile web,
- wherein the frame has an inner and an outer flange connected to one another by a flange web,
- wherein the outer flange includes a recess, and
- wherein the outer covering layer is positioned against the outer flange at least regions.

2. The window element as recited in claim 1, further comprising an outer covering layer opening and an inner covering layer opening, wherein the outer covering layer opening is of smaller extent than the inner covering layer opening, and wherein an opening of the core structure is of larger extent than the inner covering layer opening.

3. The window element as recited in claim 1, wherein the outer arm is longer than the inner arm.

4. The window element as recited in claim 1, wherein the inner flange is disposed on the inner covering layer.

5. The window element as recited in claim 1, wherein the outer covering layer is connected to the outer arm and to the outer flange.

6. The window element as recited in claim 5, wherein the outer covering layer is at least one of riveted, bolted and attached with adhesive to the inner covering layer and to the outer flange.

7. The window element as recited in claim 1, wherein the inner arm is connected to the inner covering layer and to the inner flange.

8. The window element as recited in claim 7, wherein the inner arm is at least one of riveted, bolted and attached with adhesive to the inner covering layer and to the inner flange.

9. The window element as recited in claim 1, wherein the profile web is connected to the core structure at least in some regions.

10. The window element as recited in claim 9, wherein the profile web is attached to the core structure with adhesive.

11. The window element as recited in claim 1, wherein an intermediate space is disposed between the flange web and the profile web.

12. The window element as recited in claim 1, wherein the inner covering layer and the outer covering layer contain a first material and the core structure contains a second material that is different from the first material.

13. The window element as recited in claim 1, wherein the embrasure profile is disposed between the inner covering layer and the outer covering layer.

14. The window element as recited in claim 1, wherein the profile web abuts the core structure.

\* \* \* \* \*